(12) United States Patent
Beckhaus

(10) Patent No.: US 8,994,959 B2
(45) Date of Patent: Mar. 31, 2015

(54) DEVICE AND METHOD FOR PRINTING CONTAINERS AND CAPTURING THE ROTARY POSITION OF AT LEAST ONE ROTARY DEVICE PROVIDED FOR RECEIVING THE CONTAINERS

(75) Inventor: Carsten Beckhaus, Werne (DE)

(73) Assignee: KHS GmbH, Dortmund (DE)

( * ) Notice: Subject to any disclaimer, the term of this patent is extended or adjusted under 35 U.S.C. 154(b) by 315 days.

(21) Appl. No.: 13/145,844

(22) PCT Filed: Nov. 11, 2009

(86) PCT No.: PCT/EP2009/008024
§ 371 (c)(1),
(2), (4) Date: Jul. 22, 2011

(87) PCT Pub. No.: WO2010/108527
PCT Pub. Date: Sep. 30, 2010

(65) Prior Publication Data
US 2011/0273726 A1  Nov. 10, 2011

(30) Foreign Application Priority Data

Mar. 27, 2009  (DE) .................. 10 2009 014 663

(51) Int. Cl.
G01B 11/14 (2006.01)
G01B 11/26 (2006.01)
G01C 1/00 (2006.01)
G01D 5/347 (2006.01)
B41F 17/18 (2006.01)
B41J 3/407 (2006.01)
B65C 9/06 (2006.01)

(52) U.S. Cl.
CPC .............. *G01D 5/3473* (2013.01); *B41F 17/18* (2013.01); *B41J 3/4073* (2013.01); *B65C 9/06* (2013.01)
USPC ............ 356/620; 356/614; 356/615; 356/138

(58) Field of Classification Search
None
See application file for complete search history.

(56) References Cited

U.S. PATENT DOCUMENTS

| 4,827,123 | A  | * | 5/1989  | Gray         | 250/231.14 |
| 5,471,054 | A  | * | 11/1995 | Watanabe     | 250/231.13 |
| 5,478,422 | A  |   | 12/1995 | Bright et al.|            |
| 7,210,408 | B2 | * | 5/2007  | Uptergrove   | 101/486    |
| 2010/0192517 | A1 | * | 8/2010 | Schach      | 53/411     |
| 2011/0023416 | A1 | * | 2/2011 | Leu et al.  | 53/415     |

FOREIGN PATENT DOCUMENTS

DE  69411178   10/1998
DE  10041095   6/2001

(Continued)

OTHER PUBLICATIONS

Ernst Alfons "Digitale Längen- und Winkelmesstechnik" (Jan. 1, 2001) vol. 165, pp. 60-71.

*Primary Examiner* — Kara E Geisel
*Assistant Examiner* — Hina F Ayub
(74) *Attorney, Agent, or Firm* — Occhiuti & Rohlicek LLP

(57) ABSTRACT

The invention relates to a device for capturing the rotary position (D) of at least one rotary device (4) provided for receiving a container (3) by means of at least one sensor unit (5), wherein the rotary device (4) is provided for driving the container (3) about a rotary axis (DA), and the at least one sensor unit (5) is advantageously designed for non-contact capturing of the rotary position (D) of the rotary device (4) relative to the rotary axis (DA).

19 Claims, 5 Drawing Sheets

(56) References Cited

FOREIGN PATENT DOCUMENTS

| DE | 10060287 | 6/2001 |
| DE | 102004026755 | 12/2005 |
| DE | 202006000270 | 4/2006 |
| EP | 0717703 | 6/1998 |

* cited by examiner

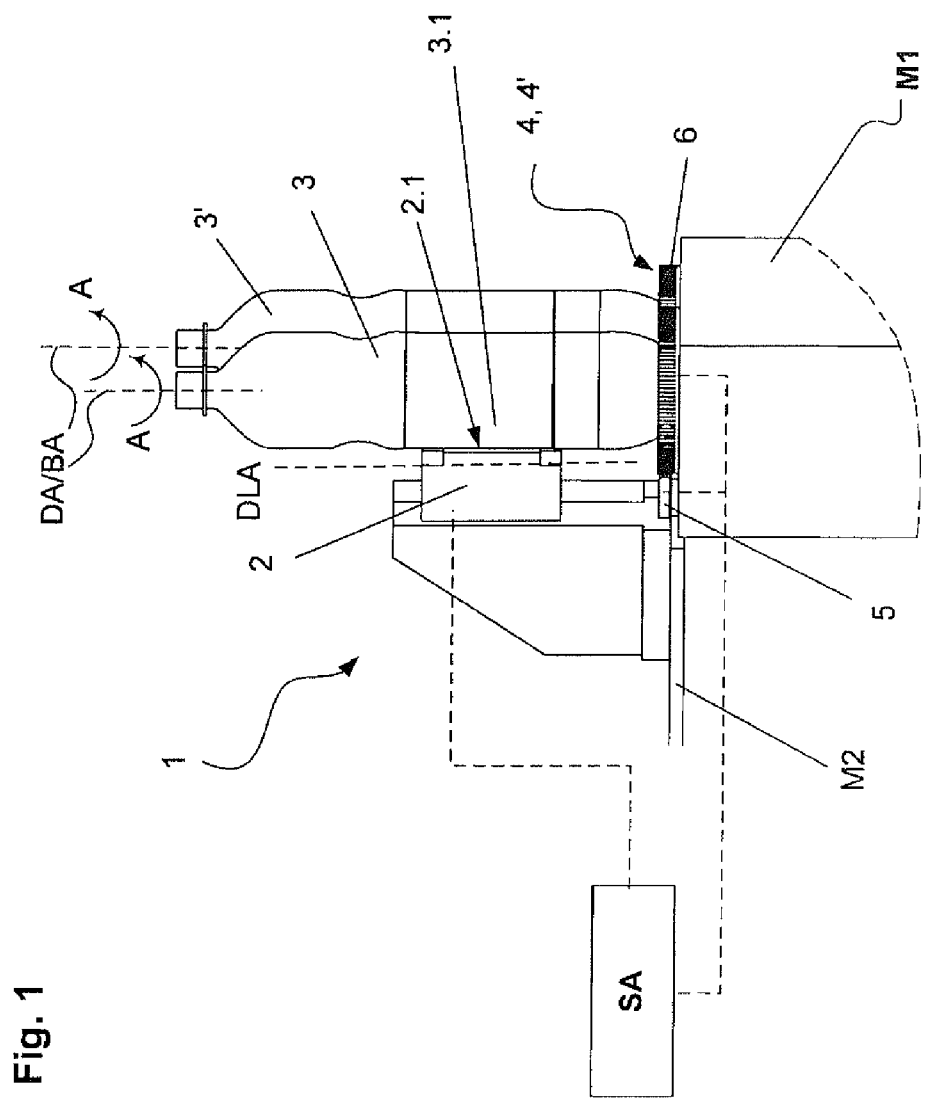

DEVICE AND METHOD FOR PRINTING CONTAINERS AND CAPTURING THE ROTARY POSITION OF AT LEAST ONE ROTARY DEVICE PROVIDED FOR RECEIVING THE CONTAINERS

CROSS-REFERENCE TO RELATED APPLICATIONS

This application is the National Stage of International Application No. PCT/EP2009/008024, filed on Nov. 11, 2009, which claims the benefit of the priority date of German Patent Application No. 10 2009 014 663.6, filed on Mar. 27, 2009. The contents of both applications are hereby incorporated by reference in their entirety.

FIELD OF INVENTION

The invention relates to a device for printing on containers.

BACKGROUND

Methods and devices for printing containers are known in principle, in particular including methods and devices for the direct printing of containers. Such methods and devices are used in particular in container treatment machines in the drinks and packaging industry.

Preferably, such devices for the preferably direct printing of containers comprise print heads which are arranged for example on a first machine part, the containers to be printed being provided on a second, movable machine part. The containers are in this case preferably mounted on the movable second machine part in such a way as to be able to rotate about their container axis, namely by means of a respective rotary plate element which is provided for receiving the bottom region of the container.

For the direct printing of containers, in particular including those which are used as packaging means in the food and/or drinks industry, an exact approach to a predefined printing position is necessary in order to be able to apply the printed image to the precisely defined printing position. However, in order to be able to control the container via the rotary plate element in the predefined printing position, the rotary position of the rotary plate element must first be precisely determined.

SUMMARY

The problem addressed by the invention is therefore that of providing a device and an associated method for detecting the rotary position of at least one rotary device provided for receiving a container, which allows a precise determination of the rotary position of the container relative to the currently assigned print head in each case, as a result of which an optimal print or an optimal printed image of high quality can be achieved.

The main aspect of the device according to the invention can be seen in that the sensor unit is designed for detecting in a contactless manner the rotary position of the rotary device. Due to the contactless position detection, an extremely reliable determination of the current rotary position is possible. Furthermore, due to the contactless position detection, there is advantageously no need for complicated cabling between the sensor unit and the rotary device, which are preferably arranged on separate machine parts. Furthermore, by evaluating the detected rotary position of the rotary device, any positioning errors that may arise during actuation of the separate machine parts can be compensated via a control and evaluation unit, i.e. any tolerances arising during the detection of the angle can quickly and easily be compensated.

With particular advantage, the sensor unit is configured in the form of an electro-optical or electromagnetic sensor unit. Optical sensor systems are extremely precise but are also susceptible to soiling, whereas magnetic sensor systems are very robust and insensitive to soiling. To this end, the rotary device has scaling means which rotate about the rotary axis and which can be detected in a contactless manner via the respective sensor unit.

Further developments, advantages and possible uses of the invention will become apparent from the following description of examples of embodiments and from the figures. All the features described and/or shown form in principle, per se or in any combination, the subject matter of the invention, regardless of the way in which they are combined in the claims or the way in which they refer back to one another. The content of the claims is also included as part of the description.

BRIEF DESCRIPTION OF THE FIGURES

The invention will be explained in more detail below with reference to the figures and on the basis of an example of embodiment. In the figures:

FIG. 1 shows, in a greatly simplified side view, a diagram of a printing station with a print head and associated sensor unit;

DETAILED DESCRIPTION

Figure 3:
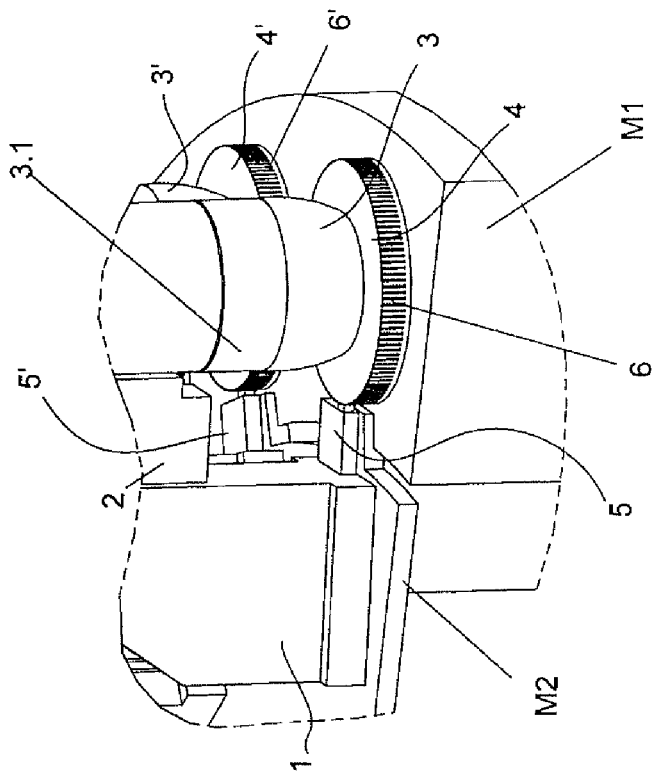
FIG. 3 shows a perspective detail view of the sensor unit and of an associated rotary device according to FIGS. 1 and 2.
Figure 2:
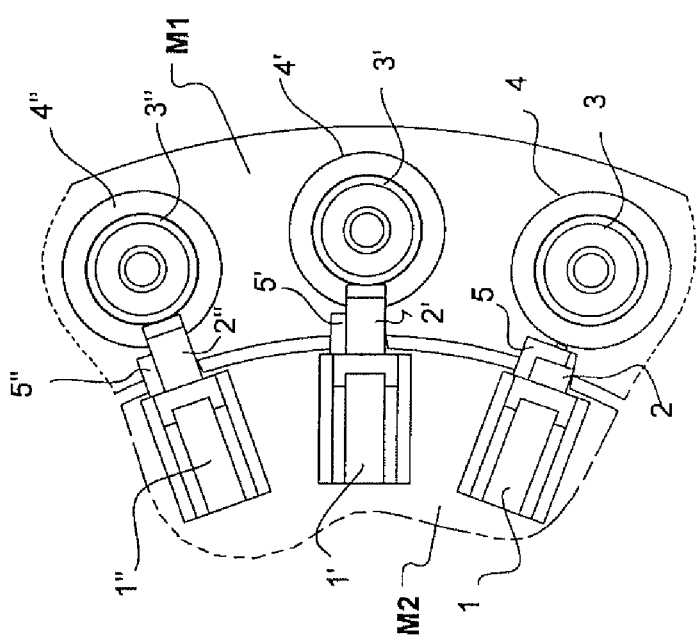
FIG. 2 shows a plan view of the printing stations according to FIG. 1 together with the container to be printed, in plan view.

In FIGS. 1 and 2, a plurality of printing stations 1, 1', 1" are shown by way of example in schematic views. Here, a printing station 1 has a preferably electrically actuated print head 2, 2', 2" for producing printed images on a respective area 3.1 to be printed on the peripheral or circumferential surface of containers 3, wherein the area 3.1 is formed for example directly by the peripheral or circumferential surface.

Figure 6:
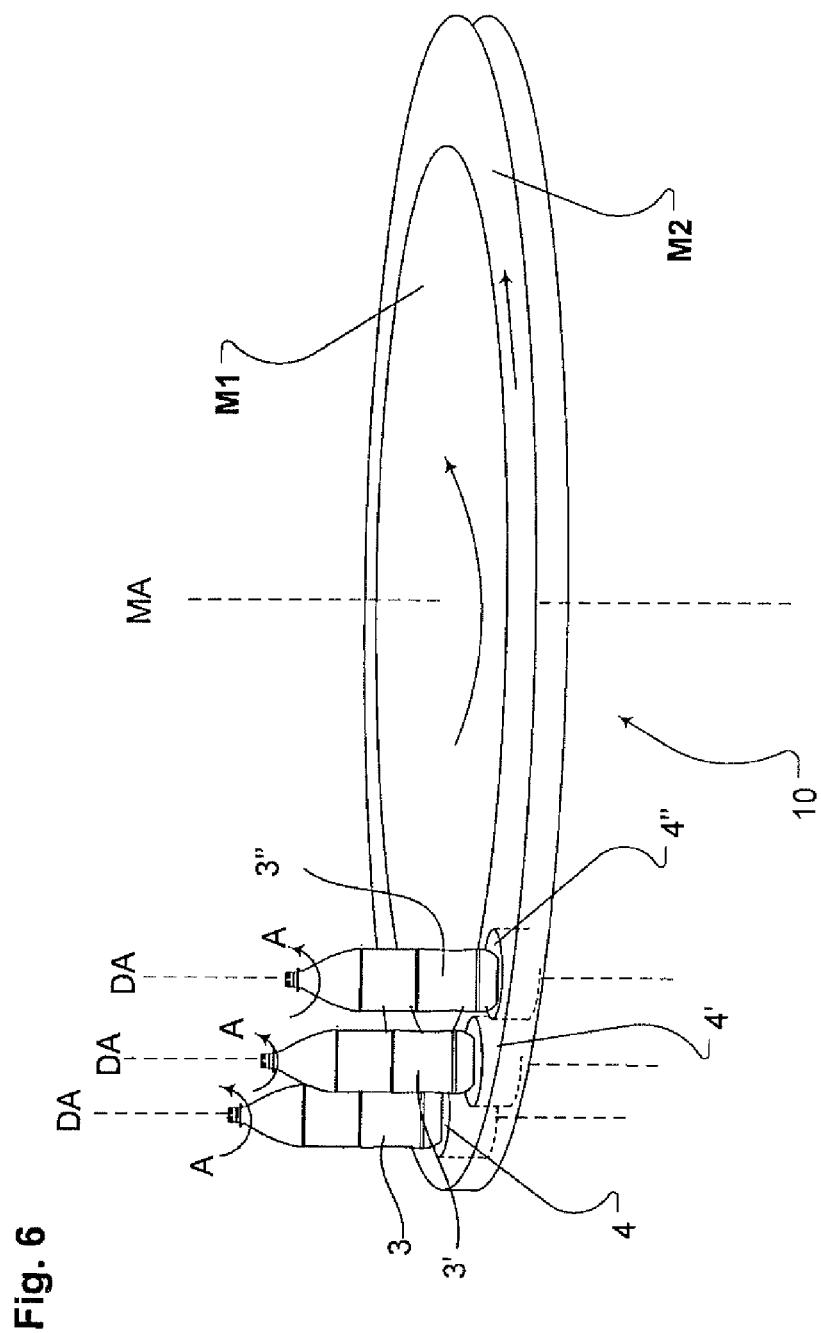
FIG. 6 shows a schematic functional diagram, in a perspective view, of an installation for the preferably direct printing of containers.

The printing stations 1 may for example be part of an installation 10 for the preferably direct printing of containers 3, the mode of operation of said installation being shown in FIG. 6 in the form of a schematic functional diagram. In the installation 10 shown in FIG. 1, however, the printing stations 1, 1', 1" are not shown for the same of clarity. Such an installation 10 may be used for example in a superordinate container treatment machine, which is not shown in the figures.

In order to print the containers 3, 3', 3", the latter are mounted in such a way as to be able to rotate about a respective rotary axis DA, DA', DA", namely preferably by means of at least one rotary device 4, 4', 4" which is provided for driving the respective container 3, 3', 3" about the associated rotary axis DA, DA', DA".

Containers 3 in the context of the invention are any packaging means which can be printed directly, in particular containers, cans, bottles, but also other packaging means which are configured in a rotationally symmetrical manner relative to their container longitudinal axis BA at least on a sub-region of their peripheral or circumferential surface. Here, the container longitudinal axis BA corresponds approximately to the rotary axis DA.

In order to determine the rotary position of the container 3 mounted in such a way as to be able to rotate about the rotary axis DA, at least one control and evaluation unit SA is also provided, which is shown schematically in FIG. 1. The drive of the rotary device 4 about the rotary axis DA is controlled by means of the control and evaluation unit SA.

In order to detect the exact rotary position D of the rotary device 4, 4', 4", at least one sensor unit 5, 5', 5" is provided which is preferably assigned to the electrically actuated print head 2, 2', 2" and is thus part of the printing station 1, 1', 1". The actuation both of the print head unit 2, 2', 2" and of the sensor unit 5, 5', 5" preferably likewise takes place via the at least one control and evaluation unit SA.

The electrically actuated print head 2 is configured here for example to produce the printed image in a line-by-line manner on the area 3.1 to be printed on the container 3, wherein in particular electrostatic print heads are suitable as the electrically actuated print head 2. By way of example, the electrically actuated print head 2 may be an inkjet print head or a print head comprising a plurality of individual nozzles which has on an active print head side 2.1 individual nozzles which are arranged one after the other in at least one row along a print head longitudinal axis DLA and which can be actuated individually to discharge printing ink. Printing ink is to be understood to mean quite generally a resource by which the respective print or the respective printed image is produced when using the electrically actuated print head 2.

The container 3, 3', 3" has, at least in the region of the area 3.1 to be printed, an outer or peripheral surface which is configured in a rotationally symmetrical manner, i.e. in the illustrated embodiment in a cylindrical shape relative to the container longitudinal axis BA or the rotary axis DA. The area 3.1 to be printed, which is either directly the outer surface of the container 3 or the surface of a substrate applied to the outer surface of the container 3, is accordingly also cylindrical relative to the container longitudinal axis BA.

During printing, the container 3 is turned or rotated about its container longitudinal axis BA or the rotary axis DA as shown by the arrow A, namely until it has reached the rotary position required for printing. Starting from this rotary position, the area 3.1 to be printed is moved relative to the print head 2, which is arranged with its print head longitudinal axis DLA parallel to the rotary axis DA, and thus the printed image is created line-by-line on the area 3.1 to be printed. In the direction of the rotary axis DA, the print head 2 has at its active print head end 2.1, which produces the respective printed image and which has the plurality of individual nozzles, a width that is at least equal to the dimension that the printed image to be produced has in the direction of the rotary axis DA.

For the quality of the printed image, it is critical inter alia that a predefined printing position of the container 3 exists at the start of the printing process, particularly since for example different base color shades of the printed image are applied to the printing area 3.1 by a plurality of print heads 2 and thus a precise superposition of the printed images having different colors is required. In order to approach the printing position, it is necessary to know the precise rotary position D of the container 3, or of the rotary device 4 receiving the container 3, relative to the print head 2, i.e. starting from the exact rotary position D of the container 3 or of the rotary device 4 receiving the container 3 the container 3 is optionally adjusted forward or backward in order to approach the printing position.

According to the invention, the detection of the rotary position D of the rotary device 4 takes place via a sensor unit 5 which operates in a contactless manner. The rotary position D of the rotary device 4 is preferably indicated in the form of an angle in relation to a reference rotary position DR, namely in each case relative to a rotary movement about the rotary axis DA.

Advantageously, the sensor unit 5 is designed as an electro-optical or electromagnetic sensor unit which interacts with scaling means 6 connected to the rotary device 4. Here, the scaling means 6 are preferably arranged on the peripheral surface of the rotary device 4 rotating about the rotary axis DA, i.e. the scaling means 6 themselves rotate about the rotary axis DA, namely in such a way that they can be detected in a contactless manner via the sensor unit 5. In order to indicate different rotary positions D of the rotary device 4, the scaling means 6 have a plurality of measurement marks 6.1 which are preferably provided at regular spacings.

In one preferred embodiment, the rotary device 4 is formed by a rotary plate element which can be driven about the rotary axis DA via a drive unit (not shown in the figures), wherein the actuation of the drive unit preferably takes place via the control and evaluation unit SA. The rotary plate element 4 has a substantially cylindrical main body which comprises a cylindrical peripheral surface 4.1 running concentrically to the rotary axis DA.

According to the example of embodiment shown in FIGS. 1 to 5, the sensor unit 5 and the rotary plate element 4 are arranged approximately in a common plane running perpendicular to the rotary axis DA, so that the cylindrical peripheral surface 4.1 of the rotary plate element 4 can be detected in a contactless manner via the sensor unit 5. In order to determine the rotary position D of the rotary plate element 4 via the contactless sensor unit 5, the scaling means 6 are arranged on the cylindrical peripheral surface 4.1 of the rotary plate element 4.

Figure 4:
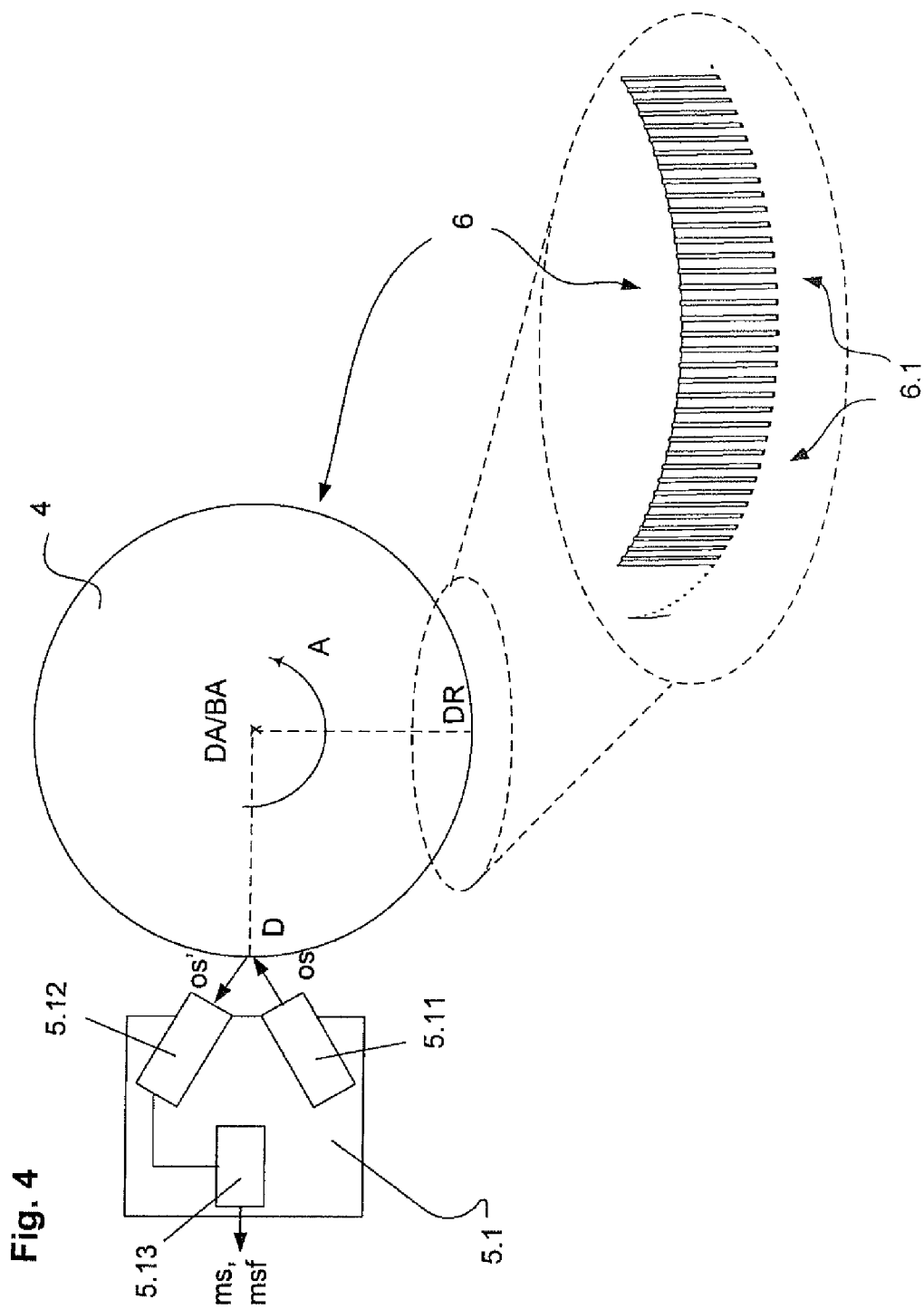
FIG. 4 shows a schematic functional diagram of an electro-optical sensor unit which is operatively connected to the rotary device.

In a first embodiment shown by way of example in FIG. 4, the contactless sensor unit 5 is designed as an electro-optical sensor unit 5.1 which has at least one optical transmitting unit 5.11 for applying an optical signal os to the scaling means 6 of the rotary device 4 and at least one optical receiving unit 5.12 for capturing an optical signal os' reflected by the scaling means 6 of the rotary device 4.

To this end, the rotating scaling means 6 are designed to reflect the optical signal os received from the optical sensor unit 5.11 in a manner dependent on the current rotary position D of the rotary device 4, namely the measurement marks 6.1 of the rotating scaling means 6 are formed by a plurality of reflection sections adjoining one another concentrically around the rotary axis DA, wherein one reflection section in each case indicates a change in the rotary position D of the rotary device 4 by a predefined angle.

In order to detect the rotary position D of the rotary plate element 4, the optical signal os is generated via the electro-optical transmitting unit 5.11 and is transmitted to the rotating scaling means 6 arranged on the cylindrical peripheral surface 4.1 of the rotary plate element 4. By means of the reflection sections forming the measurement marks 6.1, the optical signal os is at least partially reflected and thus a preferably pulsed optical signal os' is generated which is captured by the optical receiving unit 5.12 in the electro-optical sensor unit 5.1. The reflected optical signal os' captured by the optical receiving unit 5.12 is evaluated by means of an evaluation electronic unit 5.13 which is provided in the electro-optical sensor unit 5.1 and which is connected to the optical receiving unit 5.12, and at least one electrical measurement signal ms and optionally a reference measurement signal msf are generated which are transmitted to the control and evaluation unit SA for further processing.

Figure 5:
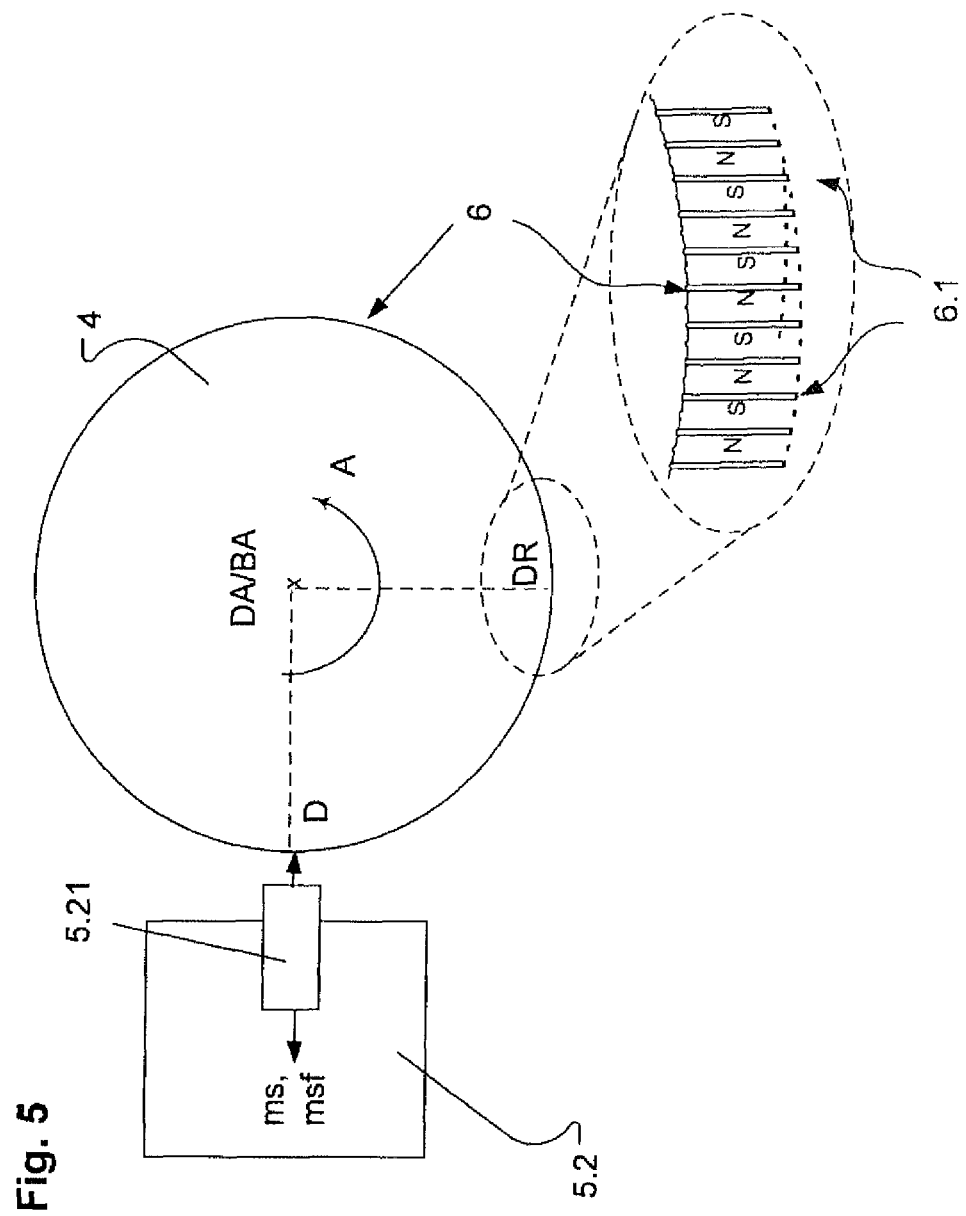
FIG. 5 shows a schematic functional diagram of an electromagnetic sensor unit which is operatively connected to the rotary device.

In a second embodiment shown by way of example in FIG. 5, the contactless sensor unit 5 is designed as an electromagnetic sensor unit 5.2 which has at least one magnetoresistive sensor electronic unit 5.21 for detecting at least one magnetic field. The rotating scaling means 6 are accordingly designed to generate at least one magnetic field, namely said scaling means are formed for example by at least one, preferably annular, magnet carrier layer which rotates about the rotary axis DA and which is magnetized with magnetic North and South poles in regular sections. In this case, the North and South poles form the measurement marks 6.1 of the rotating magnet carrier layer, which are preferably distributed concentrically around the rotary axis DA along the cylindrical peripheral surface 4.1 of the rotary plate element 4. Here, each North and South pole is associated with a change in the rotary position DD of the rotary plate element 4 by a predefined angle, i.e. a North/South pole indicates a change in the rotary position DD of the rotary plate element 4 by a predefined angle. In order to form a "magnetic measuring tape", the magnet carrier layer is preferably laminated onto a steel strip which is fixedly connected to the cylindrical peripheral surface 4.1 of the rotary plate element 4. In order to protect it against external mechanical influences, the magnet carrier layer may be covered by a protective layer.

In order to detect the rotary position D of the rotary plate element 4, the magnet carrier layer is scanned in a contactless manner by the magnetoresistive sensor electronic unit 5.21, in particular via a magnetoresistive sensor head provided for this purpose. The at least one measurement signal ms thereby detected in the magnetoresistive sensor electronic unit 5.21 is then transmitted, optionally together with a reference measurement signal msf, to the control and evaluation unit SA for further processing.

Based on the measurement signals ms received in the control and evaluation unit SA and optionally at least one available reference measurement signal msf, the current rotary position D of the rotary plate element 4 is determined and, depending thereon, the printing position of the container 3 held by the rotary plate element 4 is precisely set.

The installation 10 which is shown in FIG. 6 by means of a schematic functional diagram in perspective view and which is intended for the preferably direct printing of containers 3, 3', 3" comprises at least a first machine part M1 and a second machine part M2, wherein at least one of the machine parts M1, M2 is designed to rotate about a machine axis MA. Here, the machine axis MA runs approximately parallel to the respective rotary axis DA of the containers 3.

In one preferred embodiment, both the first and the second machine part are designed to rotate about a common machine axis MA, and namely they are driven separately from one another by a respective drive unit (not shown in FIG. 6). The actuation of the drive units may in turn take place for example via the control and evaluation unit SA.

Preferably, the first machine part M1 is designed to hold a plurality of rotary devices or rotary plate elements 4, 4', 4", and the printing stations 1 comprising the sensor units 5, 5.1, 5.2 are arranged on the second machine part M2, wherein the printing stations 1, 1', 1" comprising sensor units 5, 5.1, 5.2 are not shown in FIG. 6. With particular preference, the first machine part M1 for receiving a plurality of rotary devices or rotary plate elements 4, 4', 4" is formed by an annular rotor. Only three rotary plate elements 4, 4', 4" arranged on the annular rotor are shown by way of example in FIG. 6.

Here, the first and the second machine part M1, M2 rotate differently relative to one another, i.e. have different speeds of rotation. The printing stations 1, 1', 1" can thus be moved relative to the rotary devices or rotary plate elements 4, 4', 4" receiving the containers 3, 3', 3", as a result of which predefined printing positions can be approached individually.

By virtue of the contactless detection of the rotary position D according to the invention, synchronization inaccuracies between the first and second machine part M1, M2 can be compensated or taken into account particularly easily via the actuation of the print heads 2 and of the rotary plate elements 4, 4', 4" by the control and evaluation unit SA, namely in the context of dynamic signal processing.

The invention has been described above on the basis of an example of embodiment. It will be understood that numerous changes and modifications are possible without thereby departing from the inventive concept on which the invention is based.

It is also possible that the print head 2, 2', 2" consists of a plurality of individual print heads which are then, for example for a multicolor print, designed and actuated in each case to print one color set of this multicolor print.

It has been assumed above that, in the installation 10, a plurality of printing stations 1, 1', 1" are provided on a second machine part M2 designed as a rotor. Of course, an installation 10 which has at least one printing station 1, 1', 1" and which is intended for printing the containers 3 may also be embodied in a different form, for example as an inline machine having at least one printing station 1 which is provided on a conveyor and into which the containers 3 can be respectively introduced for printing purposes and removed therefrom after printing, or else having a plurality of printing stations 1 moving synchronously with the conveyor.

LIST OF REFERENCES 1, 1', 1" printing station
2, 2', 2" print head
2.1 active side or active part of the print head 2
3, 3', 3" container to be printed
3.1 area to be printed
4, 4', 4" rotary device or rotary plate element
5, 5', 5" sensor unit
5.1 electro-optical sensor unit
5.11 optical transmitting unit
5.12 optical receiving unit
5.13 evaluation unit
5.2 electromagnetic sensor unit
5.12 magnetoresistive sensor electronic unit
6 scaling means
6.1 measurement marks
10 installation
A rotary or rotational movement
D rotary position
DR reference rotary position
DA rotary axis
DLA print head longitudinal axis
BA container longitudinal axis
os optical signal
os' reflected optical signal
M1 first machine part
M2 second machine part
MA machine axis
ms measurement signal msf reference measurement signal
SA control and evaluation unit
N/S North/South pole

The invention claimed is:

1. An apparatus for printing on containers, said apparatus comprising a first machine part, a second machine part that moves relative to said first machine part, a plurality of electrically-controllable printing heads arranged on said first machine part, each of said printing heads, in operation, engaging in the action of printing one of a corresponding plurality of images directly on a container that is rotating about an axis thereof while said container is disposed adjacent to said printing head, said plurality of printing heads comprising a first printing head that, during operation thereof, prints a first image on said container while said container is rotating about an axis thereof and disposed adjacent to said first printing head, and a second printing head that, during operation thereof, prints a second image on a container that is disposed adjacent to said second printing head and that is rotating about an axis thereof, wherein said first image, which is printed by said first printing head, is an image that is different from said second image, which is printed by said second printing head, a plurality of rotating devices arranged on said second machine part for bringing containers from said first printing head to said second printing head, each of said rotating devices comprising a cylinder that defines a rotating-device axis about which said rotating device rotates, each of said rotating devices having a rotational position that changes from a first rotational position to a second rotational position during a time interval in which said first printing head is engaged in the action of printing an image directly on a container supported by said rotating device, a plurality of sensor units arranged on said first machine part, each of said sensor units being assigned to one of said plurality of printing heads, wherein each of said sensor units is configured for detecting a rotational position of a corresponding one of said rotating devices that is adjacent to said one of said plurality of printing heads to which said sensor unit is assigned, measurement markings, and a control-and-evaluation unit, wherein said cylinder comprises a flat surface for supporting said container, said flat surface being perpendicular to said rotating-device axis, and an outer surface, said outer surface defining, at each point thereof, a surface normal vector that is perpendicular to said rotating-device axis, wherein said measurement markings are disposed on said outer surface of said cylinder, wherein said measurement markings define a circle concentric with said rotating-device axis, wherein said sensor unit is configured for contactless detection of a rotational position of said rotating device around said rotating-device axis, wherein each of said sensor units is assigned to a corresponding one of said printing heads, and wherein said control-and-evaluation unit is configured to receive a signal from said sensor unit and, based at least in part on said signal, to determine said rotational position, and to cause said rotational device to rotate said container to said first rotational position, thereby ensuring that said first image, which is printed by said first printing head, and said second image, which is printed by said second printing head, are correctly aligned.

2. The apparatus of claim 1, wherein said measurement markings comprise concentric reflection sections bordering one another and distributed around said rotating-device axis, wherein each of said concentric reflection sections is associated with a change in a rotational position of said rotating device by a given angle.

3. The apparatus of claim 2, wherein said sensor unit comprises an electro-optical sensor unit.

4. The apparatus of claim 3, wherein said electro-optical sensor unit comprises an optical transmitting unit for illuminating said measurement markings with an optical signal, and an optical receiving unit for capturing an optical signal reflected by said measurement markings.

5. The apparatus according to claim 2, wherein said measurement markings are configured to reflect an optical signal incident thereon from said optical transmitting unit in a manner dependent on a rotational position of said rotating device.

6. The apparatus according to claim 2, wherein a transition from one reflection section to another reflection section indicates a change in a rotational position of said rotating device by a predefined angle.

7. The apparatus of claim 1, wherein said measurement markings comprise a magnetic-medium layer, wherein said magnetic-medium layer is magnetized in periodic sections with magnetic north and south poles, and wherein said north and south poles represent said measurement markings.

8. The apparatus of claim 7, wherein said sensor unit comprises an electromagnetic sensor unit.

9. The apparatus of claim 8, wherein said electromagnetic sensor unit comprises a magnetoresistive sensor electronic unit for detecting a magnetic field.

10. The apparatus of claim 9, wherein said magnetoresistive sensor electronic unit is configured to detect said poles.

11. The apparatus according to claim 7, wherein a transition between a north pole and a south pole indicates a change in rotational position of said rotating device by a predefined angle.

12. The apparatus according to claim 1, wherein said first and second machine parts are configured to rotate about a common machine axis, and wherein said machine axis runs parallel to said rotating-device axis.

13. The apparatus of claim 12, wherein said first and second machine parts are configured to rotate differently relative to one another.

14. The apparatus of claim 1, wherein said second machine part comprises an annular rotor to hold a plurality of rotating devices.

15. The apparatus of claim 1, wherein said first machine part is a conveyor of an inline machine, and wherein at least one printing station is provided on said conveyor.

16. The apparatus of claim 15, wherein plural printing stations are provided on said conveyor and wherein said printing stations move synchronously with said conveyor.

17. A method of printing on containers, said method comprising providing an apparatus that comprises a first machine part, a second machine part that moves relative to said first machine part, a plurality of electrically-controllable printing heads arranged on said first machine part, each of said printing heads, in operation, engaging in the action of printing one of a corresponding plurality of images directly on a container that is rotating about an axis thereof while said container is disposed adjacent to said printing head, said plurality of printing heads comprising a first printing head that, during operation thereof, prints a first image on said container while said container is rotating about an axis thereof and disposed adjacent to said first printing head, and a second printing head that, during operation thereof, prints a second image on a container that is disposed adjacent to said second printing head and that is rotating about an axis thereof, wherein said first image, which is printed by said first printing head, is an image that is different from said second image, which is printed by said second printing head, a plurality of rotating devices arranged on said second machine part for bringing containers from said first printing head to said second printing head each of said rotating devices comprising a cylinder that defines a rotating-device axis about which said rotating device rotates, each of said rotating devices having a rotational position that changes from a first rotational position to a second rotational position during a time interval in which said first printing head is engaged in the action of printing an image directly on a container supported by said rotating device, a plurality of sensor units arranged on said first machine part, each of said sensor units being assigned to one of said plurality of printing heads, wherein each of said sensor units is configured for detecting a rotational position of a corresponding one of said rotating devices that is adjacent to said one of said plurality of printing heads to which said sensor unit is assigned, measurement markings, and a control-and-evaluation unit, wherein said cylinder comprises a flat surface for supporting said container, said flat surface being perpendicular to said rotating-device axis, and an outer surface, said outer surface defining, at each point thereof, a surface normal vector that is perpendicular to said rotating-device axis, wherein said measurement markings are disposed on said outer surface of said cylinder, wherein said measurement markings define a circle concentric with said rotating-device axis, wherein said sensor unit is configured for contactless detection of a rotational position of said rotating device around said rotating-device axis, wherein each of said sensor units is assigned to a corresponding one of said printing heads, and wherein said control-and-evaluation unit is configured to receive a signal from said sensor unit and, based at least in part on said signal, to determine said rotational position, and to cause said rotational device to rotate said container to said first rotational position, thereby ensuring that said first image, which is printed by said first printing head, and said second image, which is printed by said second printing head, are correctly aligned, and, using said apparatus, detecting a rotational position of a one of said rotating devices provided for receiving said container, driving said container about a rotary axis thereof, and using a sensor unit for contactless detection of said measurement markings.

18. The method according to claim 17, wherein contactless detection of said rotational position comprises optically detecting said measurement markings.

19. The method according to claim 17, wherein contactless detection of said rotational position comprises magnetically detecting.

* * * * *